US012022806B2

(12) United States Patent
Tuthill et al.

(10) Patent No.: US 12,022,806 B2
(45) Date of Patent: Jul. 2, 2024

(54) DOOR ASSEMBLY FOR AN ANIMAL ENCLOSURE

(71) Applicant: Hebe Studio Limited, Oxfordshire (GB)

(72) Inventors: James Tuthill, Oxfordshire (GB); Johannes Paul, London (GB); Simon Nicholls, Northhamptonshire (GB); William Windham, Oxfordshire (GB)

(73) Assignee: HEBE STUDIO LTD., Oxforshire (GB)

( * ) Notice: Subject to any disclaimer, the term of this patent is extended or adjusted under 35 U.S.C. 154(b) by 950 days.

(21) Appl. No.: 16/969,276

(22) PCT Filed: Feb. 13, 2019

(86) PCT No.: PCT/EP2019/053522
§ 371 (c)(1),
(2) Date: Aug. 12, 2020

(87) PCT Pub. No.: WO2019/158570
PCT Pub. Date: Aug. 22, 2019

(65) Prior Publication Data
US 2021/0000080 A1 Jan. 7, 2021

(30) Foreign Application Priority Data
Feb. 13, 2018 (GB) ...................... 1802355

(51) Int. Cl.
*A01K 31/02* (2006.01)
*E05F 15/635* (2015.01)
*E05F 15/79* (2015.01)

(52) U.S. Cl.
CPC ............ *A01K 31/02* (2013.01); *E05F 15/635* (2015.01); *E05F 15/79* (2015.01)

(58) Field of Classification Search
CPC ........ A01K 31/02; A01K 1/0017; A01K 1/10; A01K 31/18; E05F 15/635; E05F 15/79;
(Continued)

(56) References Cited

U.S. PATENT DOCUMENTS 589,111 A * 8/1897 Banner .................. A01K 31/02
119/495
978,010 A * 12/1910 Faust ..................... A01K 31/18
119/493
(Continued)

FOREIGN PATENT DOCUMENTS

| CN | 205694949 U | 11/2016 |
| DE | 948291 C | 8/1956 |
| GB | 2102492 A | 2/1983 |

OTHER PUBLICATIONS

Anonymous: "Automatic Coop Door Opener/Closer, Chickens Stuck Outside at Night, Backyard Chickens", Oct. 30, 2011, URL: https://www.backyardchickens.com/threads/automatic-coop-door-opener-closer-chickens-stuck-outside-at-night.591628/#post-7741259.
(Continued)

*Primary Examiner* — Brady W Frazier
*Assistant Examiner* — Zoe Tam Tran
(74) *Attorney, Agent, or Firm* — Taft Stettinius & Hollister LLP; Stephen F. Rost

(57) ABSTRACT

A door assembly (13) for an animal enclosure, the door assembly comprising: a frame (23) for mounting over an aperture (21) in a wall of the enclosure; a door (19) moveably mounted in the frame (23), the door (19) being moveable between a position where the aperture in the wall is open for the passage of an animal and a position where the aperture in the wall is closed thereby to prevent the passage of an animal; and a motor (37) for driving the door (19) between the closed and open positions.

11 Claims, 13 Drawing Sheets

(58) Field of Classification Search
CPC ... E05F 15/697; E05F 15/619; E05F 15/0006; E05F 11/1426; E06B 3/4618; A01M 23/20; E05B 2015/0235; E05B 65/08; E05B 65/087
USPC .......................................................... 119/494
See application file for complete search history.

(56) References Cited

U.S. PATENT DOCUMENTS

| | | | | | |
|---|---|---|---|---|---|
| 1,381,015 | A | * | 6/1921 | Reincke | A01K 31/02 |
| | | | | | 119/495 |
| 2,258,344 | A | * | 10/1941 | Walker | B65D 7/00 |
| | | | | | 119/493 |
| 2,531,116 | A | * | 11/1950 | Donoghue | E05F 15/71 |
| | | | | | 49/23 |
| 3,184,806 | A | * | 5/1965 | Bragman | E06B 3/4618 |
| | | | | | 16/93 R |
| 3,530,618 | A | * | 9/1970 | Abraham | E06B 3/4618 |
| | | | | | 49/504 |
| 3,874,118 | A | * | 4/1975 | Robinson | E06B 7/32 |
| | | | | | 49/169 |
| 5,406,748 | A | * | 4/1995 | Davlantes | E06B 7/32 |
| | | | | | 49/245 |
| 5,581,940 | A | * | 12/1996 | Peterson | E06B 7/32 |
| | | | | | 49/386 |
| D445,915 | S | * | 7/2001 | Kirk | D25/48.3 |
| 6,681,524 | B1 | * | 1/2004 | Tillson | E06B 7/32 |
| | | | | | 160/180 |
| 7,984,695 | B1 | * | 7/2011 | Shaffer | E06B 7/32 |
| | | | | | 119/501 |
| D743,051 | S | * | 11/2015 | Swensson | D25/60 |
| 9,775,329 | B1 | | 10/2017 | Miller | |
| 2005/0097842 | A1 | * | 5/2005 | Arcamonte | E06B 9/04 |
| | | | | | 52/204.5 |
| 2007/0200370 | A1 | * | 8/2007 | Reithmeyer | E05B 65/087 |
| | | | | | 292/340 |
| 2008/0163553 | A1 | * | 7/2008 | Liao | E05F 15/689 |
| | | | | | 49/362 |
| 2011/0113692 | A1 | | 5/2011 | Stamper | |
| 2015/0272082 | A1 | | 10/2015 | Miller | |
| 2016/0326789 | A1 | * | 11/2016 | Ando | E06B 3/4609 |
| 2017/0165386 | A1 | * | 6/2017 | Huang | A61L 2/26 |
| 2019/0162007 | A1 | * | 5/2019 | Hall | E06B 3/4618 |

OTHER PUBLICATIONS

International Search Report & Written Opinion, PCT/EP2019/053522, European Patent Office, dated Aug. 22, 2019.

* cited by examiner

FIG. 1a (*Prior Art*)
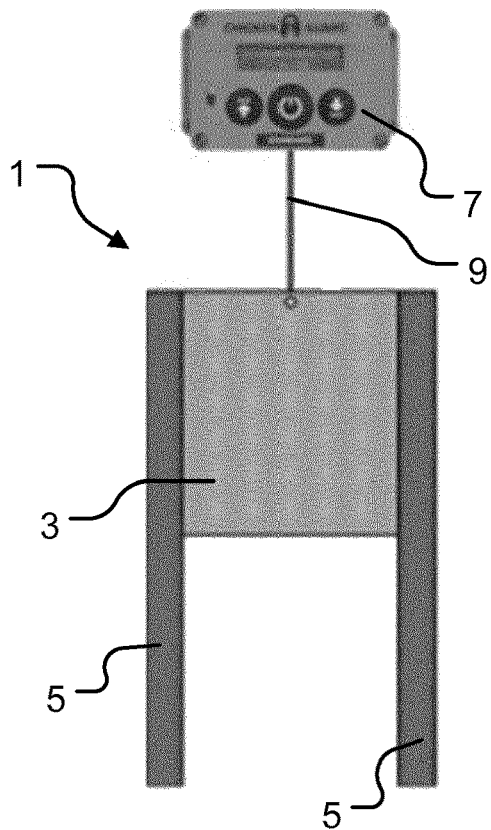
FIG. 1b (*Prior Art*)
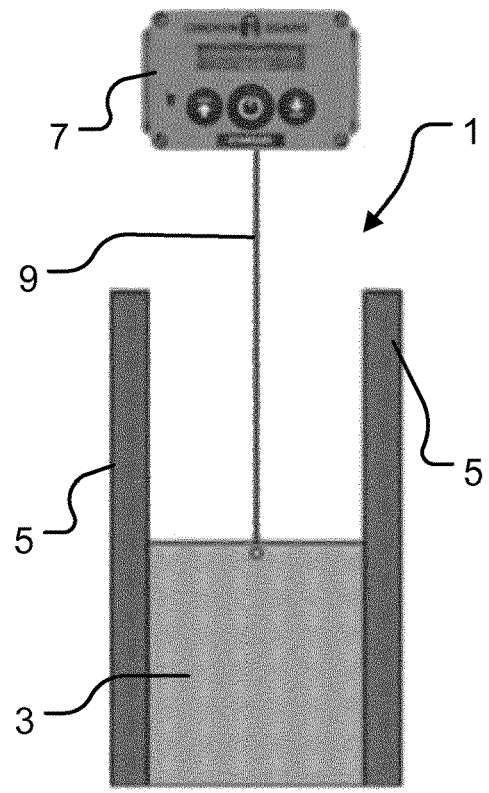
FIG. 2
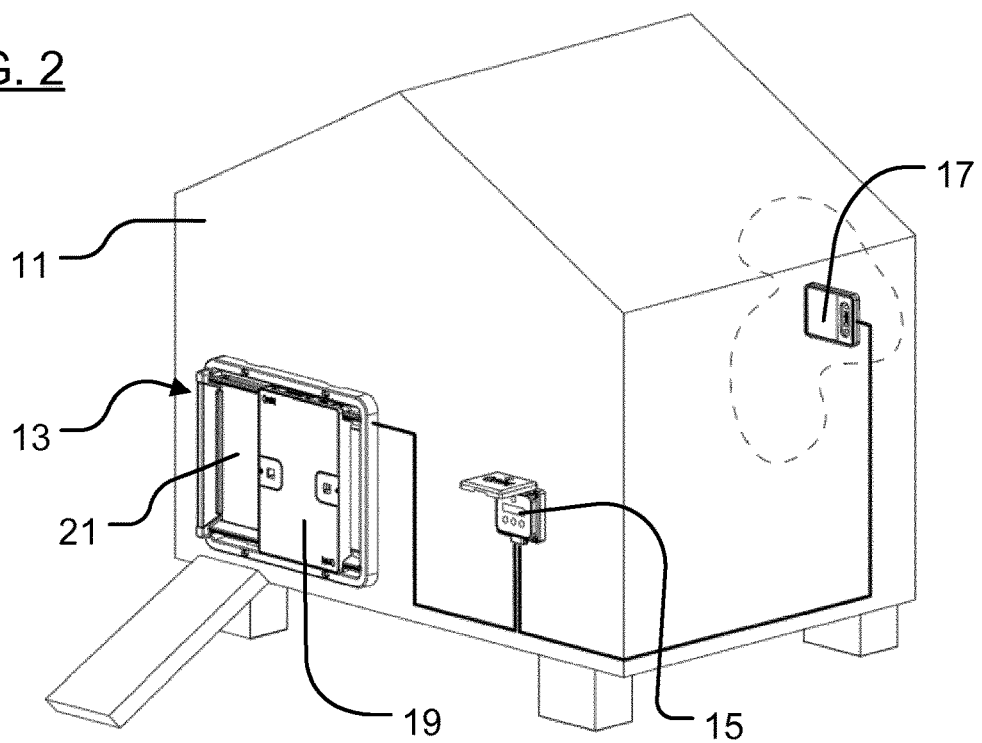

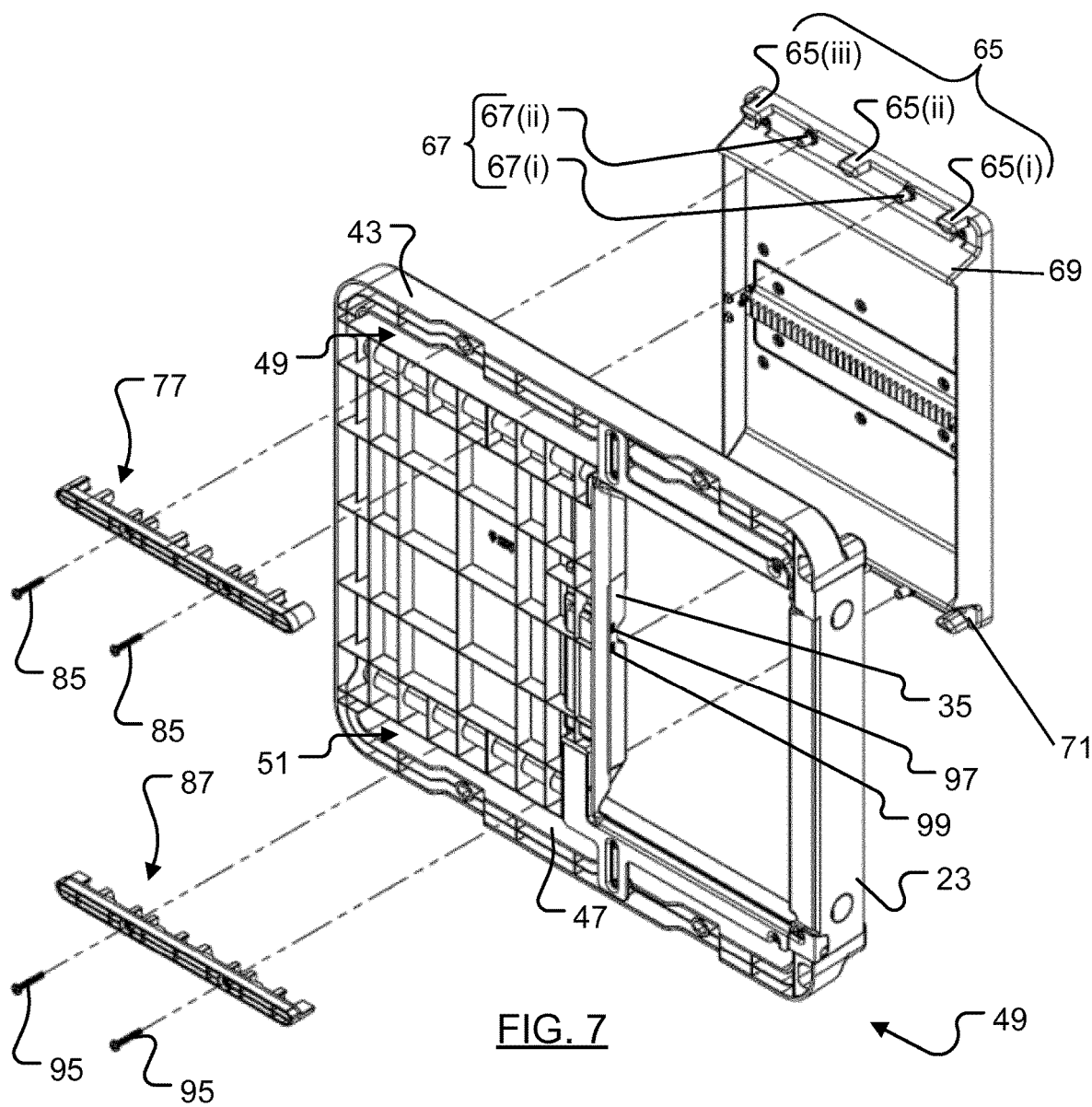
FIG. 7
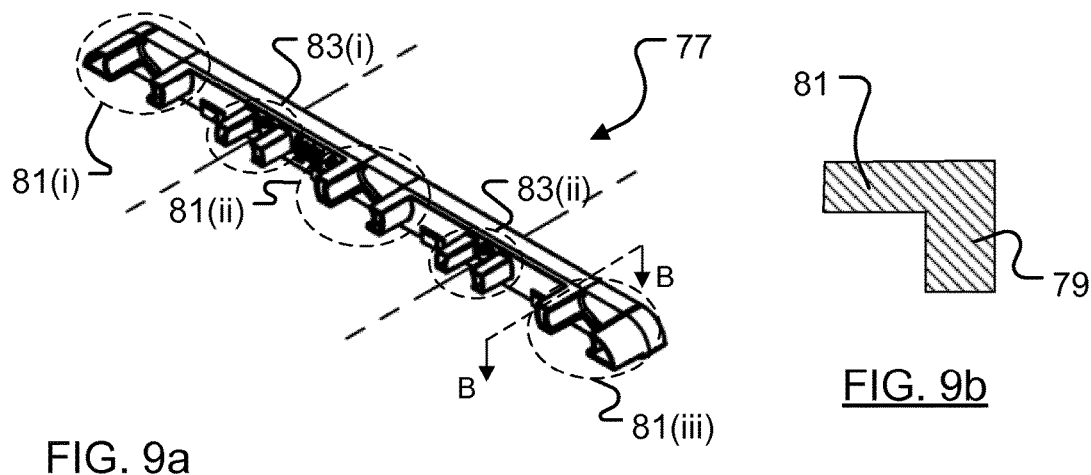
FIG. 9a
FIG. 9b

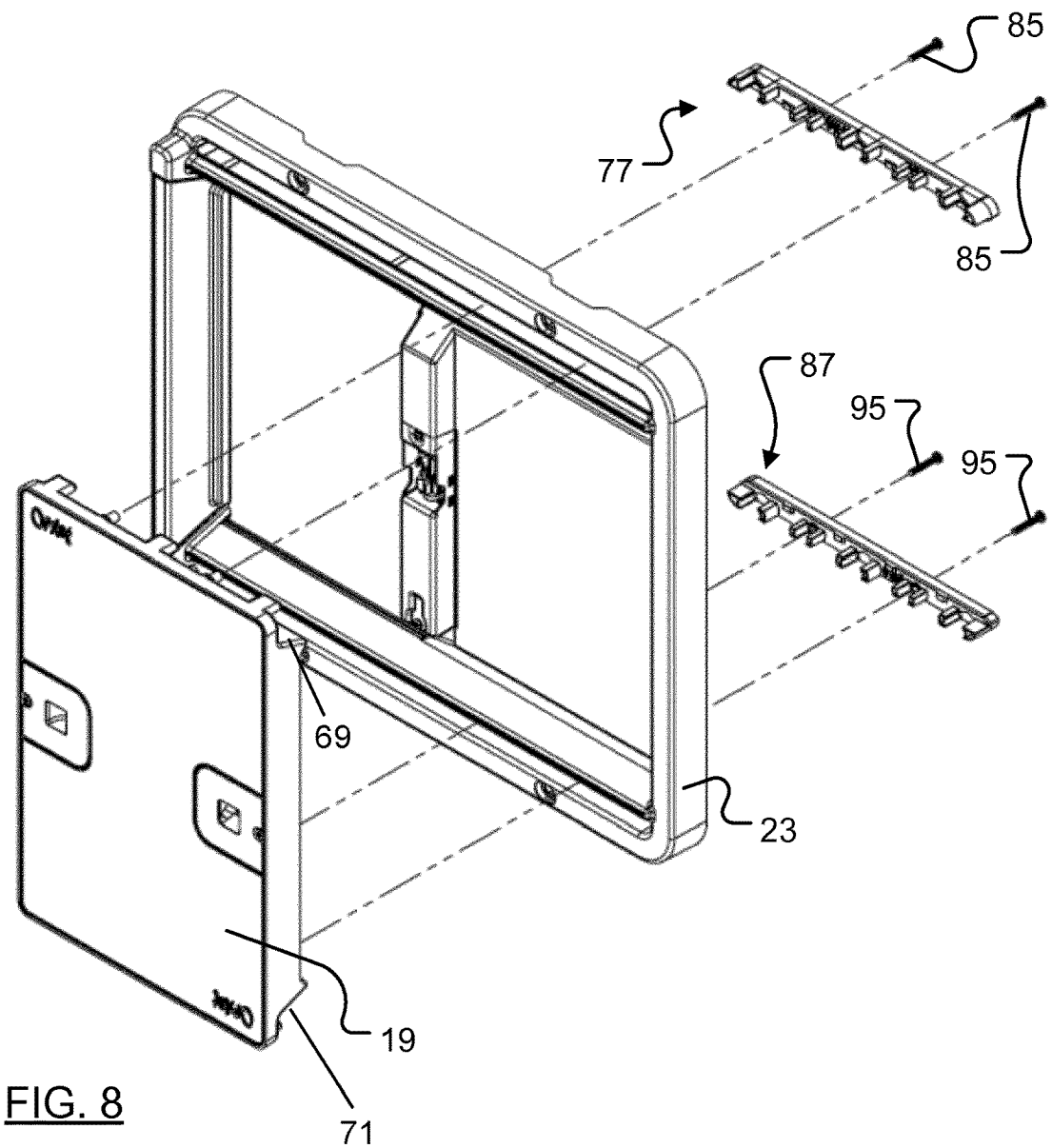
FIG. 8
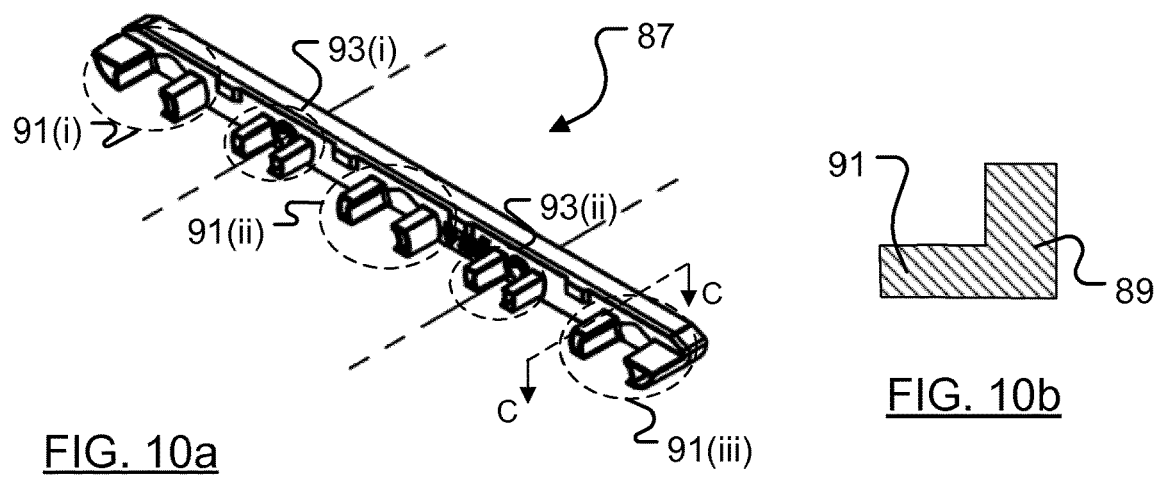
FIG. 10a
FIG. 10b

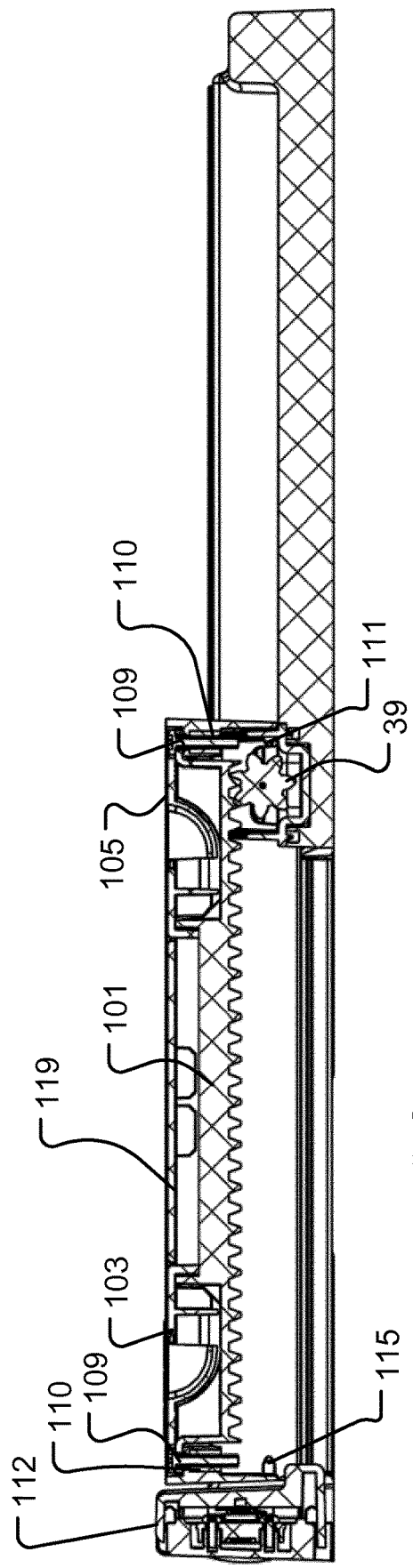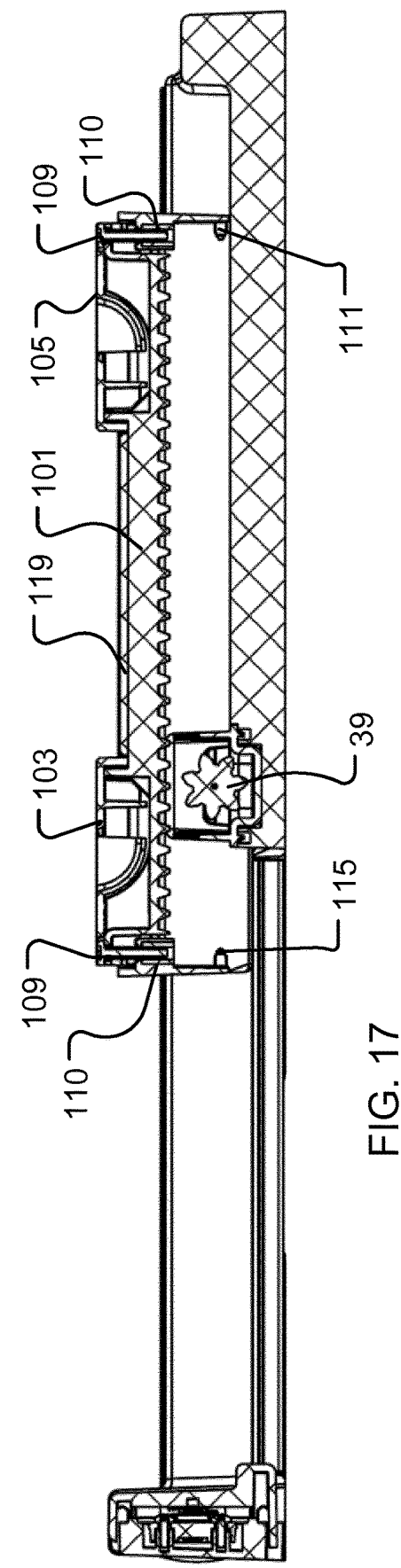

ID Assembly FOR AN ANIMAL
ENCLOSURE

This application is a U.S. national stage application under 35 U.S.C. § 371 of PCT International Application Serial No. PCT/EP2019/053522, which has an international filing date of Feb. 13, 2019, designates the United States of America, and claims the benefit of GB Application No. 1802355.6, which was filed on Feb. 13, 2018, the disclosures of which are hereby expressly incorporated by reference in their entirety.

FIELD

One aspect of the present invention relates to a door assembly for an animal enclosure. Another aspect of the present invention relates to a door control system that includes such a door assembly.

These, and other, aspects of the invention are described in detail below with specific reference to a door assembly for a chicken coop. It will be apparent, however, that the door assembly may be used with other types of animal enclosure, or for enclosing other types of animals. As such, references hereafter to chicken coops should not be construed to be intended to limit the scope of the present invention to animal enclosures of this type, or indeed to animal enclosures for chickens.

BACKGROUND

One previously proposed door assembly is the so-called "chicken guard" manufactured by ChickenGuard Ltd, Unit 2 Station Yard, Wilbraham Rd, Cambridge, CB21 5ET, United Kingdom (see also: www.chickenguard.com). A similar product is available from Chuxaway Ltd (see www.chuxaway.com).

Referring to FIGS. 1a and 1b, the door assembly 1 comprises a door panel 3 that is mounted for sliding movement in a pair of guides 5. The door panel 3 is connected to a controller 7 by means of a cord 9. A motor-driven reel within the controller can be operated to draw the cord into the controller housing to raise the door to the open position shown in FIG. 1a, and to wind out cord to move lower the door from the open position shown in FIG. 1a into the closed position shown in FIG. 1b.

One model of controller, the so-called ChickenGuard® Standard includes timing circuitry that enables a user to set a time at which the door is to opened and closed. Other models of controller, such as the ChickenGuard® Premium and ChickenGuard® Extreme, include a photosensor so that the doors can be programmed to automatically open/close at set times or at a set light level.

Whilst these previously proposed arrangements often function adequately, they can be time consuming and difficult to install as the length of the cord needs to be adjusted depending on the size of the coop with which the door opener is to be used. Another problem is that as the door is not locked in the closed position, it is conceivable that a predator may be able to lift the closed door and gain access to the coop. Another issue associated with this arrangement is that if a chicken should be sat in the doorway of the coop, then the door will sit on top of the chicken. Whilst the weight of the door is unlikely to harm the chicken, the obstruction of the door by the chicken may allow other chickens to leave the coop. The present invention has been devised with these problems in mind.

SUMMARY

In accordance with a presently preferred embodiment of the present invention, there is provided a door assembly for an animal enclosure, the door assembly comprising: a frame for mounting over an aperture in a wall of the enclosure; a door moveably mounted in the frame, the door being moveable (slideable) between a position where the aperture in the wall is open for the passage of an animal and a position where the aperture in the wall is closed thereby to prevent the passage of an animal; and a motor for driving the door between the closed and open positions. This arrangement is advantageous, vis a vis previously proposed systems, as the installation process is relatively straightforward without requiring adjustment of the assembly before use.

Preferably the motor is provided within the frame.

Preferably the motor is configured to drive a pinion that is engageable with a rack carried by the door.

Preferably the rack is moveable between a position where the rack engages with the motor driven pinion, and a position where the rack is disengaged from the motor driven pinion. This is advantageous as it allows the rack to be disengaged so that the door can manually be opened and closed.

Preferably a leading edge of the door is recessed when the door is closed to obstruct access for predators.

Preferably at least one wall of the frame that defines an opening through the door assembly is inclined so as to encourage debris to fall away from the frame.

Preferably the door assembly further comprises a first two-part locking mechanism operable to lock the door to the frame when the door is open. The first two-part locking mechanism may comprise a locking pin carried by one of the door and the frame that is engageable with a socket on the other of the door and the frame when the door is in the open position. The first two-part locking mechanism may be configured to tighten the door against the frame. This is advantageous as it reduces the likelihood of the pinion slipping against the rack.

Preferably the door assembly further comprises a second two-part locking mechanism operable to lock the door to the frame when the door is closed. The second two-part locking mechanism may comprise a locking pin carried by one of the door and the frame that is engageable with a socket on the other of the door and the frame when the door is in the closed position. The second two-part locking mechanism may be configured to tighten the door against the frame.

Preferably the assembly is capable of being mounted in one of a plurality of different orientations. Preferably the assembly is configured for mounting on the outside or on the inside of an animal enclosure.

The door assembly may further comprise a crush detector, for example one or more TACT switches.

Another aspect of the invention relates to a kit comprising a door assembly of the type described herein and a controller operable to actuate the motor to drive the door between closed and open positions at selectable intervals. The controller can be powered by one or more of: a battery, a solar panel or a mains power source. The controller may include a light detector. The controller may include a programmable processor. The processor can preferably be programmed to operate the door assembly at predetermined times. The processor can preferably be programmed to open and close the door at predetermined light levels.

The controller may be configured to monitor stall current of said motor, and to cease operating the door if the motor stall current exceeds a predetermined value.

The kit may comprise a lamp for connection to said controller. Power for said lamp may be drawn from said controller.

Another aspect of the invention relates to a system for an animal enclosure, the assembly comprising: a door assembly comprising a door mounted in a frame, the frame being fittable into a wall of the animal enclosure, the door assembly including a motor for driving the door between a closed position and an open position; a lamp for mounting inside of the enclosure; and a controller configured to actuate the motor at selectable intervals to drive the door to the closed position; and to actuate the lamp for the purpose of luring animals into the enclosure before the door is driven to the closed position.

A further aspect of the invention provides a system for an animal enclosure, the assembly comprising: a door assembly of the type described herein; a lamp for mounting inside of the enclosure; and a controller configured to actuate the motor at selectable intervals to drive the door to the closed position; and to actuate the lamp for the purpose of luring animals into the enclosure before the door is driven to the closed position

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 1a and 1b are schematic representations of a previously proposed door assembly;

FIG. 2 is a schematic representation of a chicken coop;

FIGS. 7 and 8 are, respectively, exploded front and rear perspective views of the door assembly showing the manner in which the door is mounted for movement in the frame;

FIGS. 9a and 9b are, respectively, perspective and cross-sectional views (along the line B-B of FIG. 9a) of a first retainer;

FIGS. 10a and 10b are, respectively, perspective and cross-sectional views (along the line C-C of FIG. 10a) of a second retainer;

FIG. 16 is a cross-sectional view along the line D-D of FIG. 14 with the door in a closed position;

FIG. 17 is a cross-sectional view along the line E-E of FIG. 15;

DETAILED DESCRIPTION

Figure 3:
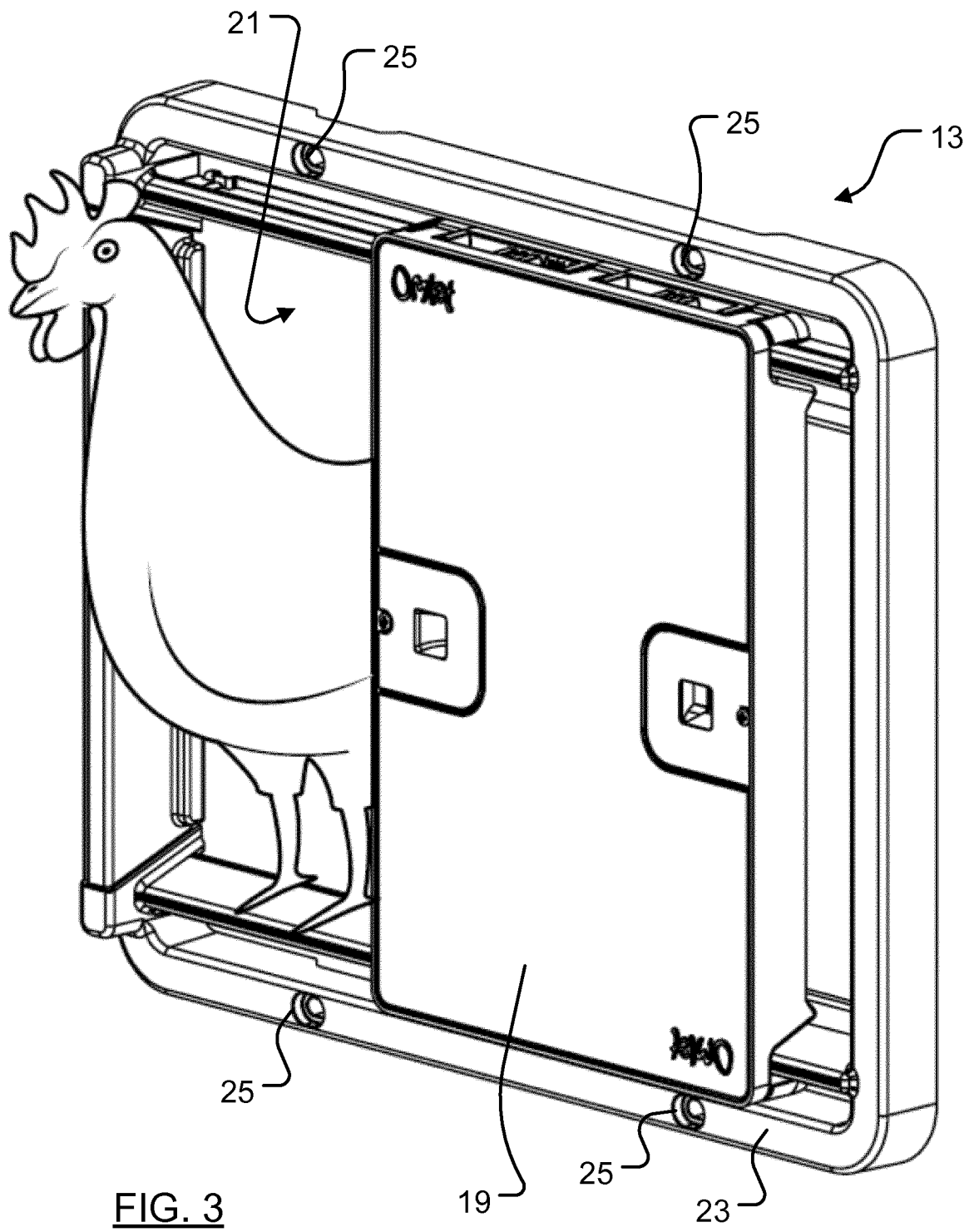
FIG. 3 is a schematic perspective view of a door assembly that embodies the teachings of the present invention.

Referring now to FIG. 2 of the accompanying drawings, there is depicted a schematic representation of a chicken coop 11 in which a door assembly 13 (shown in an open configuration) embodying the teachings of the present invention has been installed. The door assembly 13 is (in this particular example) coupled to a controller 15, and—in this particular arrangement—the controller 15 is coupled to a lamp 17 that is located inside the chicken coop 11. In this particular illustrative example, the door assembly 13 is connected to the chicken coop 11 so that a door 19 of the assembly 13 can move left to close an access opening 21 in the coop wall, and right to open the access opening 21. An advantage of the door assembly disclosed herein is that it can be mounted in any orientation. For example, the door assembly could be mounted to the coop wall so that the door 19 moves right to close the access opening, or even so that the door 19 moves up and down to open and close the opening 21.

The functionality of the controller 15 will later be described in detail. At this juncture it suffices to mention that in the preferred arrangement the controller is programmable by a user, and is electrically coupled to the door assembly for the supply of power to the door assembly and for the receipt of signals from electronics provided within the door assembly. Since coops are often located within a predator proof run, enabling the controller to be located remotely from the door assembly is advantageous as the controller can be located outside of the run, thereby making it more accessible than it would otherwise be were it to be mounted inside the run on the coop itself. That said, it is envisaged that the controller could be incorporated into the door assembly or indeed for a functionally simpler door assembly to be provided. Such a functionally simpler door assembly may not be programmable by a user, and may instead include a photosensor (which could be mounted in the door assembly) and electronics configured to open and close the door assembly at pre-determined light levels (for example, to close the door assembly at dusk and open the door assembly at dawn). Power for this simpler door assembly could be provided in a variety of different ways, for example by means of a battery provided within the door assembly. In a particularly preferred arrangement, the battery could be a rechargeable battery that is configured to be trickle-charged by means of a solar panel mounted to or built into the door assembly, or by a solar panel mounted remotely from the assembly.

As shown in FIG. 3, the door assembly 13 comprises a frame 23 that is fixed to the coop wall (not shown in FIG. 3). The door 19 is mounted for movement in the frame 23 to open and close the access opening 21 of the coop. A particular advantage of the door assembly 13 herein disclosed is that it is relatively simple to install. All one need do is position the frame over an opening 21 in the coop wall so that the door 19 covers the opening 21 when the door 19 is closed, and then attach the frame 23 to the coop wall by means of suitable fixings (for example, screws or bolts) inserted through fixing points 25 in the frame, and—in the preferred arrangement—then connect the door assembly to the controller.

Figure 4A:
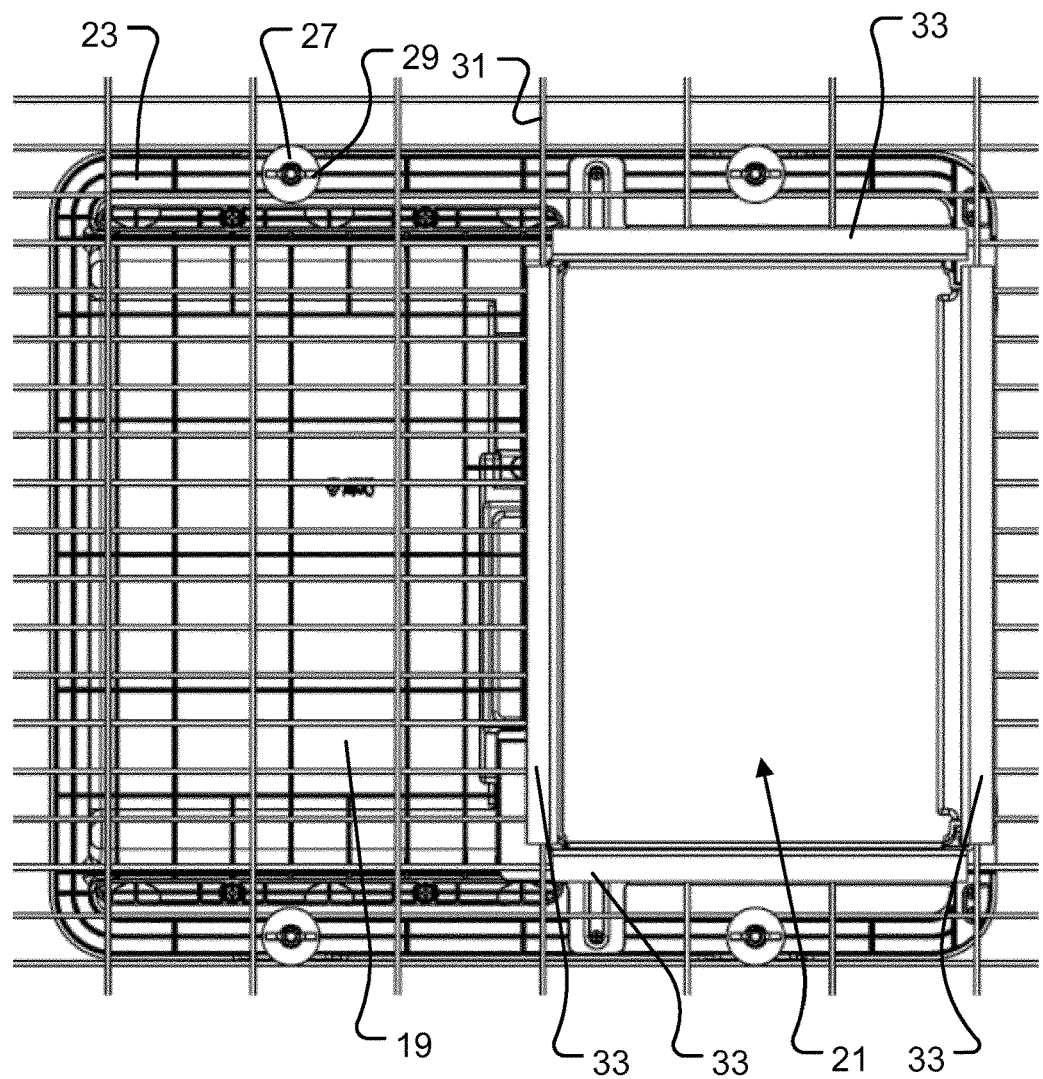
FIG. 4a is a schematic rear view of a door assembly that has been installed in a mesh wall.

Unlike the aforementioned previously proposed door assembly, the door assembly herein disclosed can easily be coupled to solid or mesh coop walls. FIG. 4a is a schematic rear view of a door assembly that has been installed in a mesh coop wall. In this instance, washers 27 have been passed over the tail ends of bolts inserted through the fixing points 25 of the frame, and wing nuts 29 have been coupled to the bolts to sandwich the mesh wall 31 between the frame 23 and the washers 27. In the event that the user chooses to make a new opening in the mesh wall 31, for example by cutting a suitably sized hole into the wall 31, generally U-shaped edge protectors 33 may be fitted over the cut sides of the hole so as to protect any animals within the enclosure from injury.

Figure 4B:
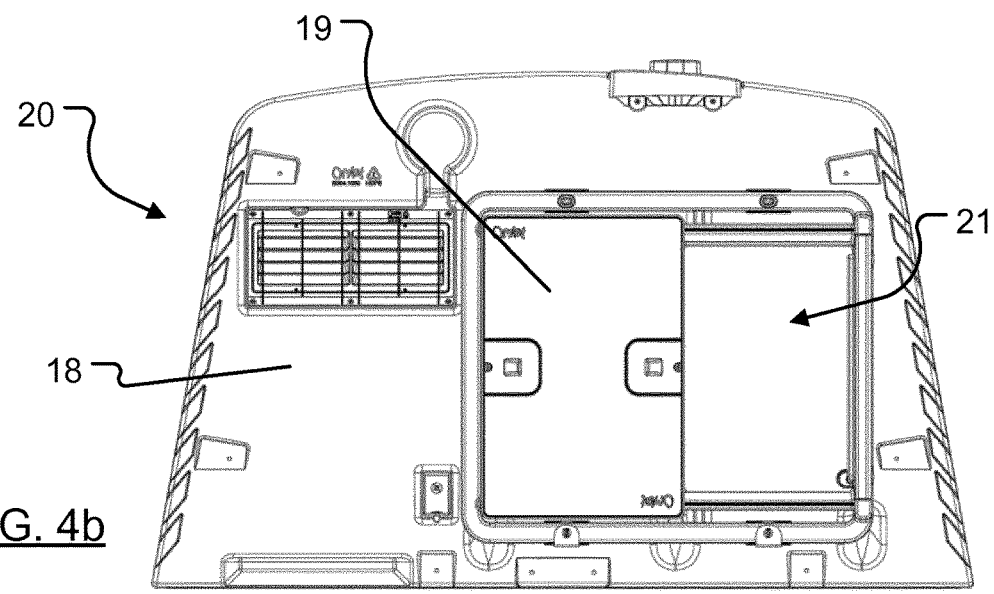
FIG. 4b is a schematic view of a door assembly mounted inside an animal enclosure.

It is also possible, as depicted schematically in FIG. 4b, to couple the door assembly 13 to the inside wall 18 of an animal enclosure 20 (in this instance a chicken coop).

Figure 5:
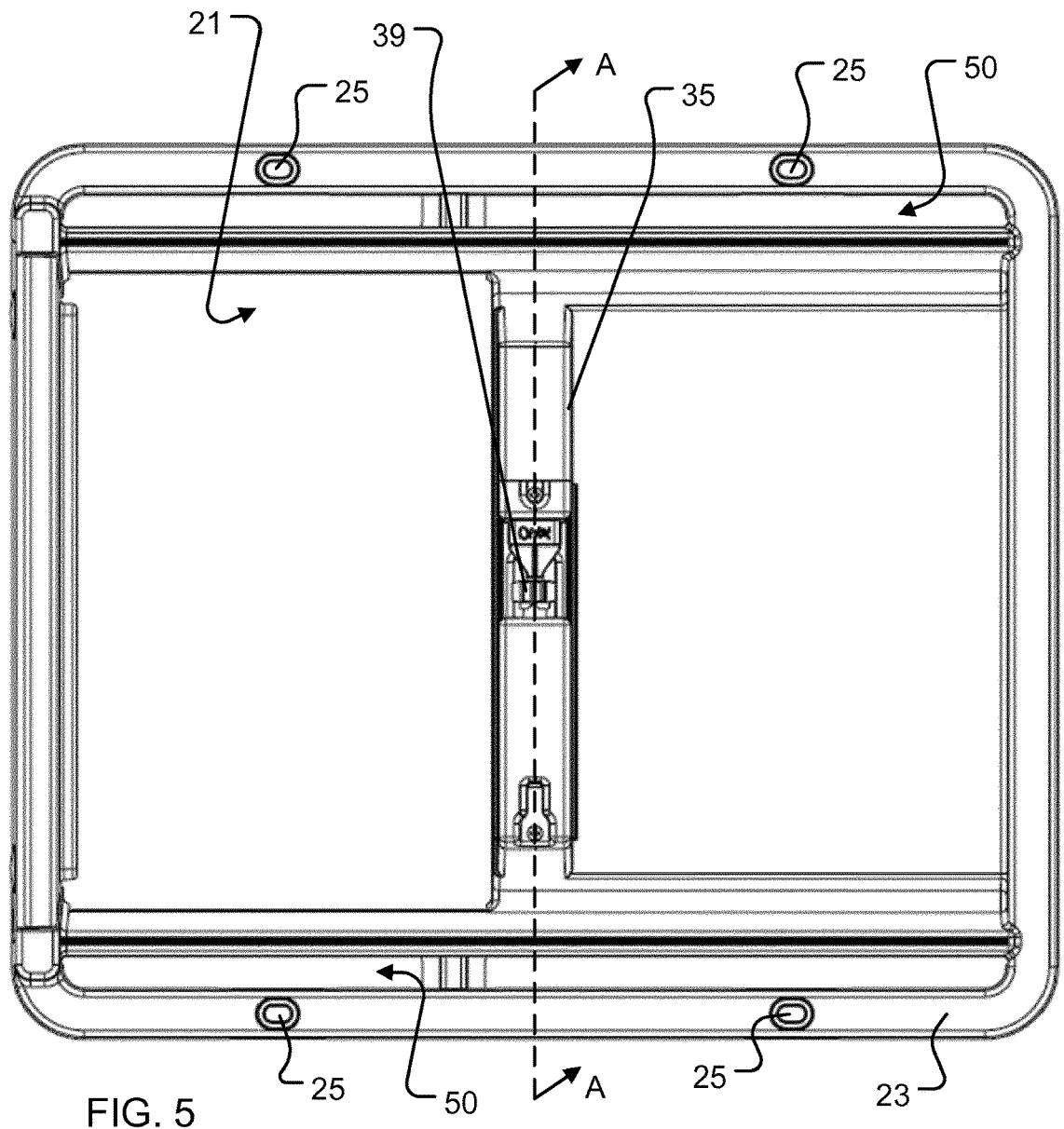
FIG. 5 is a schematic front elevation of a door assembly from which the door has been removed.
Figure 6:
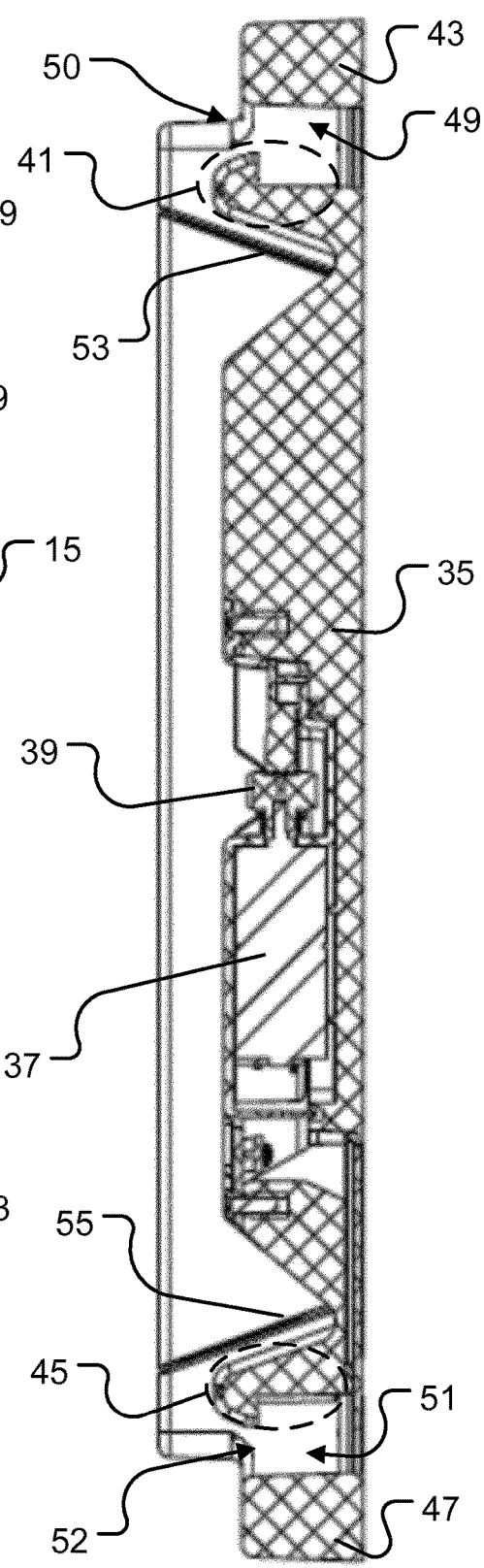
FIG. 6 is a cross-sectional view along the line A-A of FIG. 5.

FIG. 5 of the drawings depicts a schematic front elevation of a door assembly from which the door has been removed, and FIG. 6 is a cross-sectional view along the line A-A of FIG. 5. Referring now to FIGS. 5 and 6, the frame 23 includes a motor body 35 within which an electric motor 37 is provided. The electric motor 37 is configured to rotate an exposed pinion 39 provided within a recess in the motor body 35. The motor preferably has a relatively low stall current (for example, circa 300 mA, preferably 200 to 400 mA) to avoid hurting a chicken that should find itself in the way of the door.

Respective end portions 41, 45 of the motor body 35 cooperate with adjacent peripheral walls 43, 47 of the frame to define first and second recesses 49, 51 that extend along the length of the frame to provide channels in which—as will later be explained—parts of the door and a retainer are slideably accommodated when the door is coupled to the frame 23. Each recess is open towards the rear of the frame and includes a slot 50, 52 that opens towards the front of the frame.

As best shown in FIG. 6, the frame 23 includes first and frame second walls 53, 55 that co-operate to define, in part, the opening 21 through the door assembly 13. The first and second frame walls 53, 55 are inclined towards the respective adjacent peripheral walls 43, 47 of the frame 23, and an advantage of this arrangement is that—regardless of whether the door assembly is orientated as shown in FIG. 3 or rotated through 180 degrees—faeces or other detritus will tend to fall out of the door assembly and thus away from a position where it might impede progress of the door 19.

Referring now to FIGS. 7 and 8, there are provided exploded front and rear schematic views, respectively, of the door assembly depicting the way that the door 19 is mounted for movement in the frame 23. The door includes a generally rectangular front face 57 bounded by a peripheral wall comprised of a pair of spaced transverse walls 59, 60 and a pair of spaced longitudinal walls 61, 62. The transverse walls each include a plurality of tabs 65 (in this instance three) and a plurality of spaced sockets 67 (in this instance two). As shown, the longitudinal walls 61, 62 are extended in a rearward direction (i.e. in a direction towards the frame 23 when the door is mounted in the frame) and co-operate with first and second inclined door walls 69, 71 to form a skirt 73 that defines a void 75 behind the front face 57 of the door 19. The first and second inclined door walls 69, 71 are respectively inclined (at least approximately) at complementary angles to the inclined walls 53, 55 of the frame so that the door and frame inclined walls are adjacent one another when the door is mounted in the frame.

When the door is offered up to the front of the frame, the tabs 65 on the uppermost (as illustrated) transverse peripheral wall project through the slot 50 into the first frame recess 49, and the tabs 65 on the lowermost (again, as illustrated) transverse peripheral wall project through the slot 52 into the second frame recess 51.

Referring now to FIGS. 7, 8, 9a, 9b and 12, there is depicted a schematic representation of a first retainer 77 for connection to the uppermost transverse wall of the door 19 when the first retainer is received in the first recess 49. The first retainer comprises a support 79 from which a plurality of tab engaging columns 81 extend. Respective pairs of tab engaging columns 81(*i*), 81(*ii*) and 81(*iii*) are configured, when the first retainer 77 is fitted into recess 49, to engage with (specifically, to fit closely around) corresponding tabs 65(*i*), 65(*ii*) and 65(*iii*) projecting from the uppermost transverse wall of the door 19. The first retainer 77 also comprises a plurality of socket engaging columns 83 that extend from the support 73. Respective pairs of socket engaging columns 83(*i*), 83(*ii*) are configured, when the first retainer 77 is fitted into the first recess 49, to engage with (specifically, to fit closely around) corresponding sockets 67(*i*), 67(*ii*) projecting from the uppermost transverse wall of the door 19. Once the first retainer 77 has been fitted into the first recess and into engagement with the tabs and sockets of the door, fixings 85 (e.g. bolts or screws) can be inserted through the retainer and into the door to securely couple the retainer to the uppermost transverse wall of the door.

FIG. 10a is a schematic representation of a second retainer 87 for connection to the lowermost transverse wall of the door 19 when the second retainer 87 is received in the second recess 51. The second retainer 87 is similar in construction and operation to the first retainer 77, and comprises a support 89 from which a plurality of tab engaging columns 91 extend. Respective pairs of tab engaging columns 91(*i*), 91(*ii*) and 91(*iii*) are configured, when the retainer 87 is fitted into recess 51, to engage with (specifically, to fit closely around) corresponding tabs 66(*i*), 66(*ii*) and 66(*iii*) projecting from the lowermost transverse wall of the door 19. The second retainer 87 also comprises a plurality of socket engaging columns 93 that extend from the support 89. Respective pairs of socket engaging columns 83(*i*), 83(*ii*) are configured, when the second retainer 87 is fitted into the second recess 52, to engage with (specifically, to fit closely around) corresponding sockets 68(*i*), 68(*ii*) projecting from the lowermost wall of the door 19. Once the retainer 87 has been fitted into the second recess and into engagement with the door, fixings 95 (e.g. bolts or screws) can be inserted through the retainer and into the door to securely couple the retainer to the door.

As the first and second retainers are, as illustrated in FIGS. 9b and 10b, generally L-shaped in cross-section, the supports 79, 89 cannot be drawn through the respective slots 50, 52 and once the retainers are located in their respective recesses 49, 51 and fixed to the door, the door 19 will be coupled to the frame 23 for sliding movement between open and closed positions.

Referring once again to FIG. 7, the motor housing 35 also includes a first aperture 97 and a second aperture 99 that together form a first part of a first two-part locking mechanism that will later be described in detail. A third and a fourth aperture (hidden from view in FIG. 7) are provided on the opposite side of the motor housing 35 and form the first part of a second two-part locking mechanism.

Figure 11:
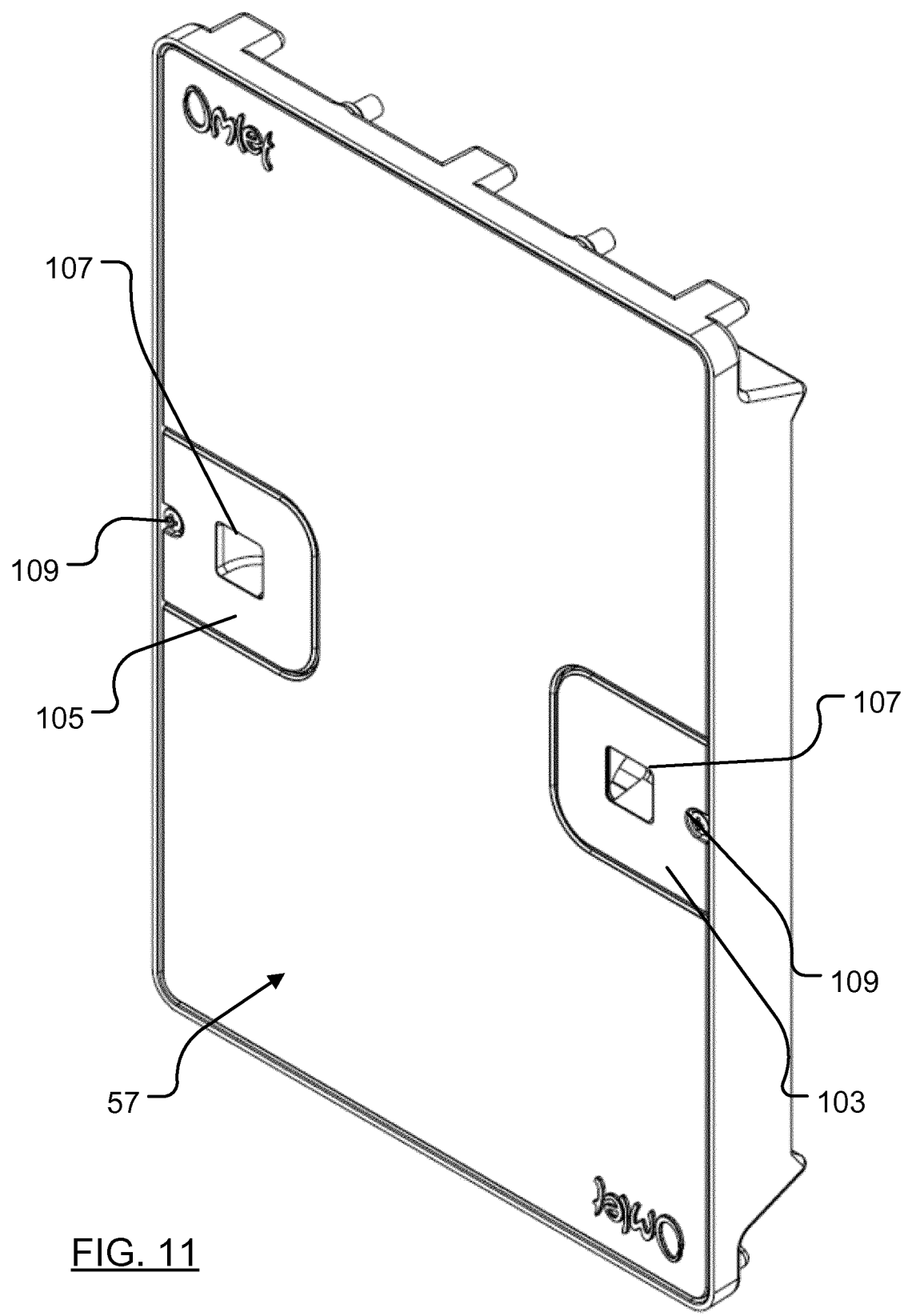
FIGS. 11 and 12 are, respectively, front and rear perspective views of the door of the door assembly.
Figure 12:
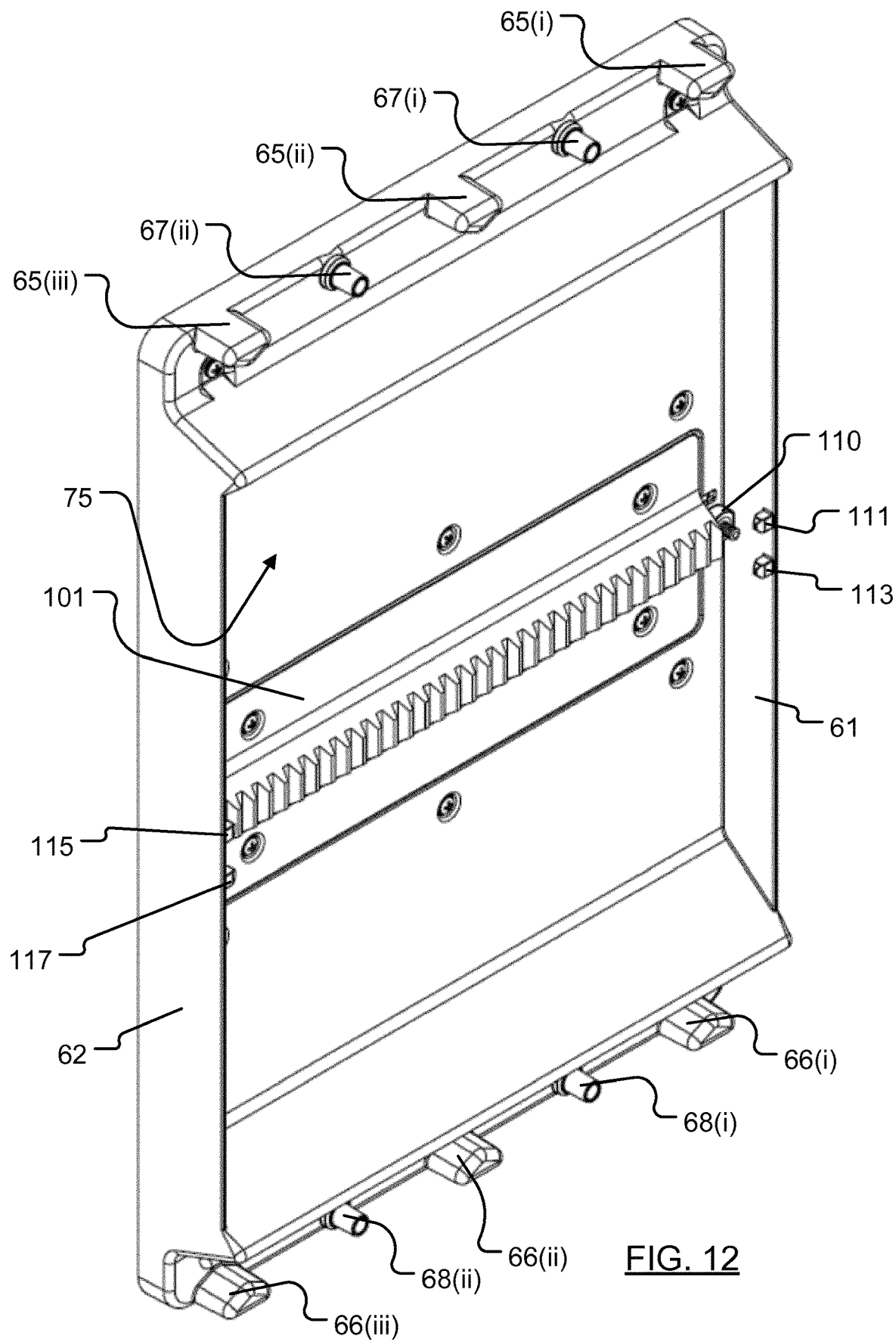

FIGS. 11 and 12 are, respectively, front and rear perspective views of the door 19. As shown in FIG. 12, within the void 75 defined by the skirt 73 there is provided a rack 101 that is fixedly coupled to first and second generally D-shaped mounts 103, 105 in the front face 57 of the door 19. Each of the mounts includes a finger pocket 107 into which a user can insert a finger and move the mounts (and hence the rack 101) relative to the remainder of the door. Each of the mounts 103, 105 is secured to a nut 110 (only one of which is visible) fixed within the void 75 by a single fixing 109. When the rack 101 is in the position indicated in FIG. 12, the rack can be engaged with the pinion 39, and rotation of the pinion by the motor 37 will tend to open or close the door 19 (depending on the direction in which the pinion is rotated).

The first longitudinal wall 61 of the door carries first and second projections 111, 113 within the void 75 in close proximity to the peripheral edge of the longitudinal wall. These first and second projections 111, 113 are configured to mate with the first and second apertures 97, 99, respectively, in the motor housing 35 when the door 19 is fully open to thereby lock the door in the open position and resist pulling of the door away from the frame. Second and third projections 115, 117 are similarly arranged on the second longitudinal wall 62 for mating with the aforementioned third and fourth aperture in the motor housing 35 when the door is in the fully closed position. The projections form the second parts of the aforementioned first and second two-part locking mechanisms.

In addition to providing a locking mechanism, driving the projections into the apertures tends to draw the rack towards the pinion, thereby lessening the chance of the pinion slipping when the motor first starts to operate.

Figure 13:
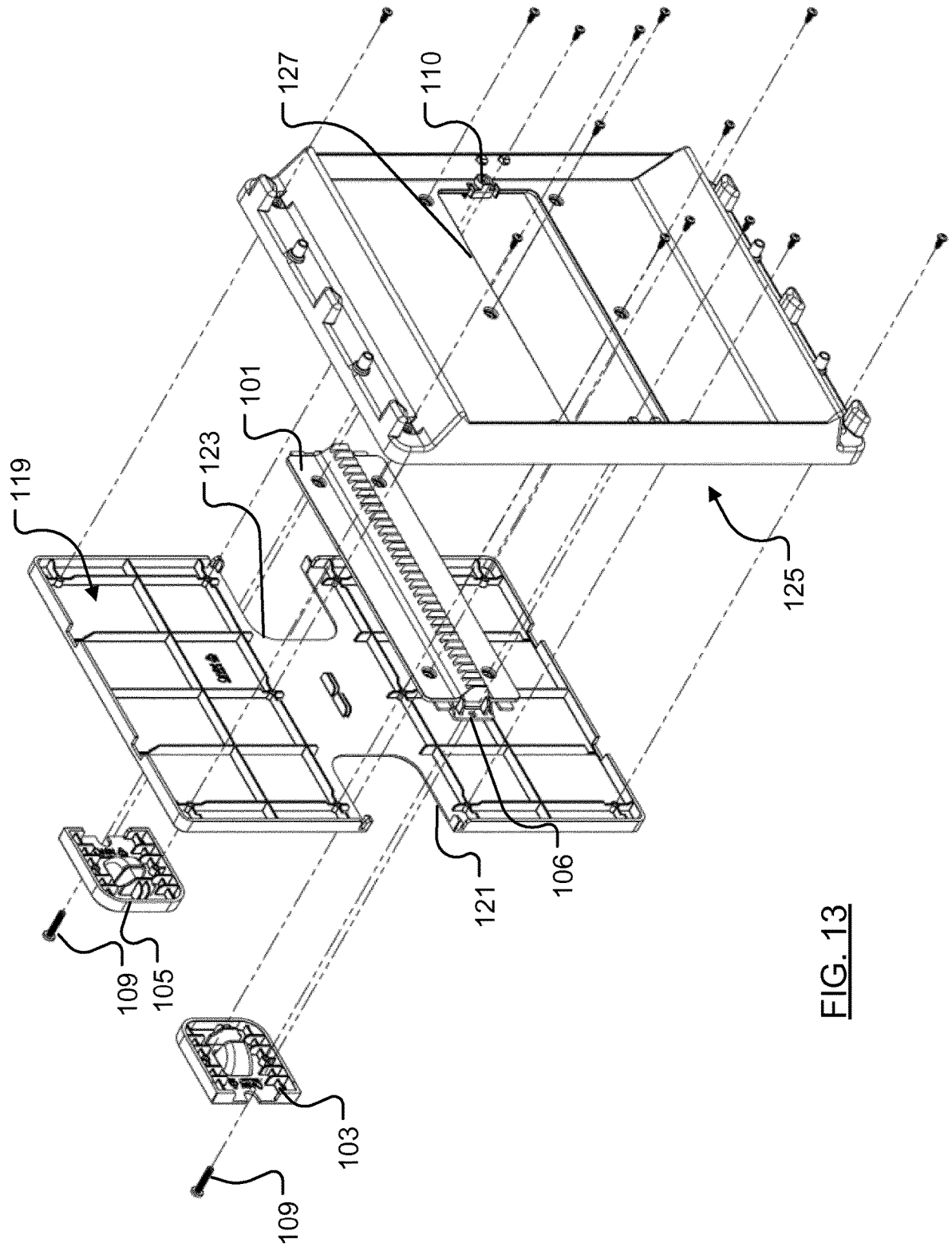
FIG. 13 is an exploded view of the door shown in FIG. 12.

FIG. 13 is an exploded view of the door 19. As shown, the door 19 is a multi-part assembly, and comprises a first door part 119 that forms the majority of the front face 57. The first part includes first and second generally D-shaped cut-outs 121, 123 in which the first and second mounts 103, 105 locate.

The first door part 119 of the door is fixedly coupled, for example by means of a plurality of screws, to a second door part 125 that includes a letterbox shaped aperture 127 within the void 75. The rack 101 is fixedly coupled (for example, screwed) to the first and second mounts, is provided between the first and second door parts 119 125 and is configured to be locatable within the letterbox shaped aperture 127 of the second part 125.

A single fixing 109 (for example a screw or bolt) passes through a hole in each of the D-shaped mounts 103, 105, a hole 106 in respective ends of the rack 101 (only one of which is visible), and engages with the aforementioned nuts 110 (only one of which is visible) that are fixed to the second door part 125 adjacent the aforementioned letterbox shaped aperture 127. As will be appreciated by persons skilled in the art, as the fixings 109 are screwed into the associated nuts 109 the rack will be advanced into the aperture 127 of the second part 125, whereas when the fixings are unscrewed from the associated nuts 109, the rack will be withdrawn from the aperture 127 into a space between the first and second door parts.

Figure 14:
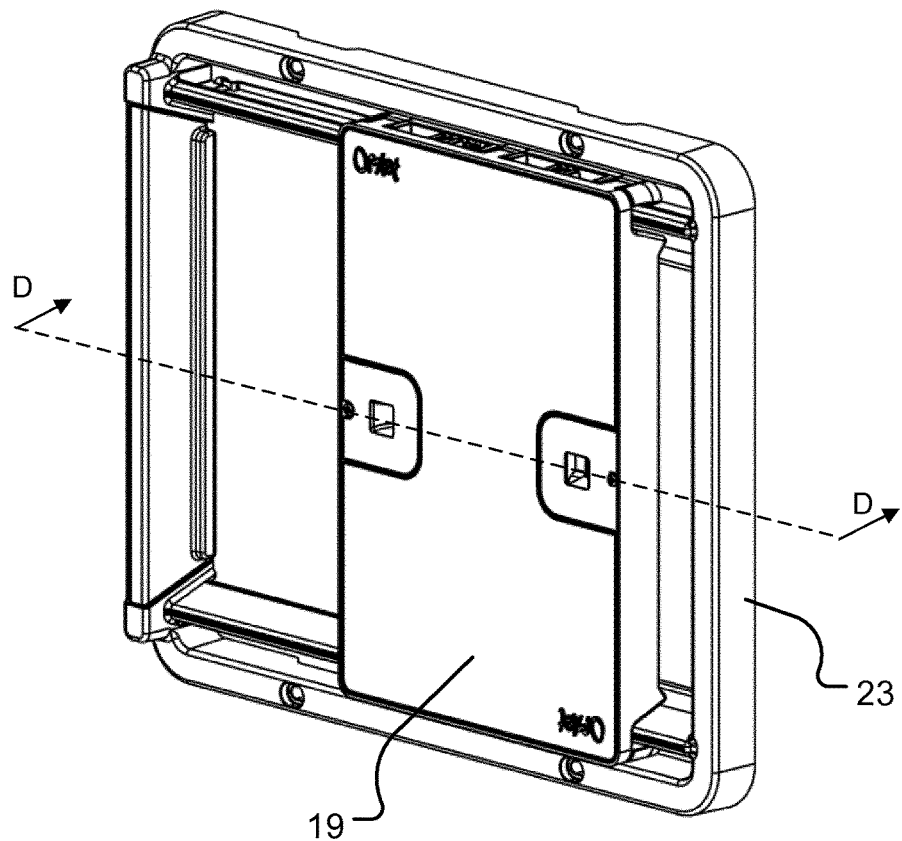
FIGS. 14 and 15 are perspective views of the door assembly.
Figure 15:
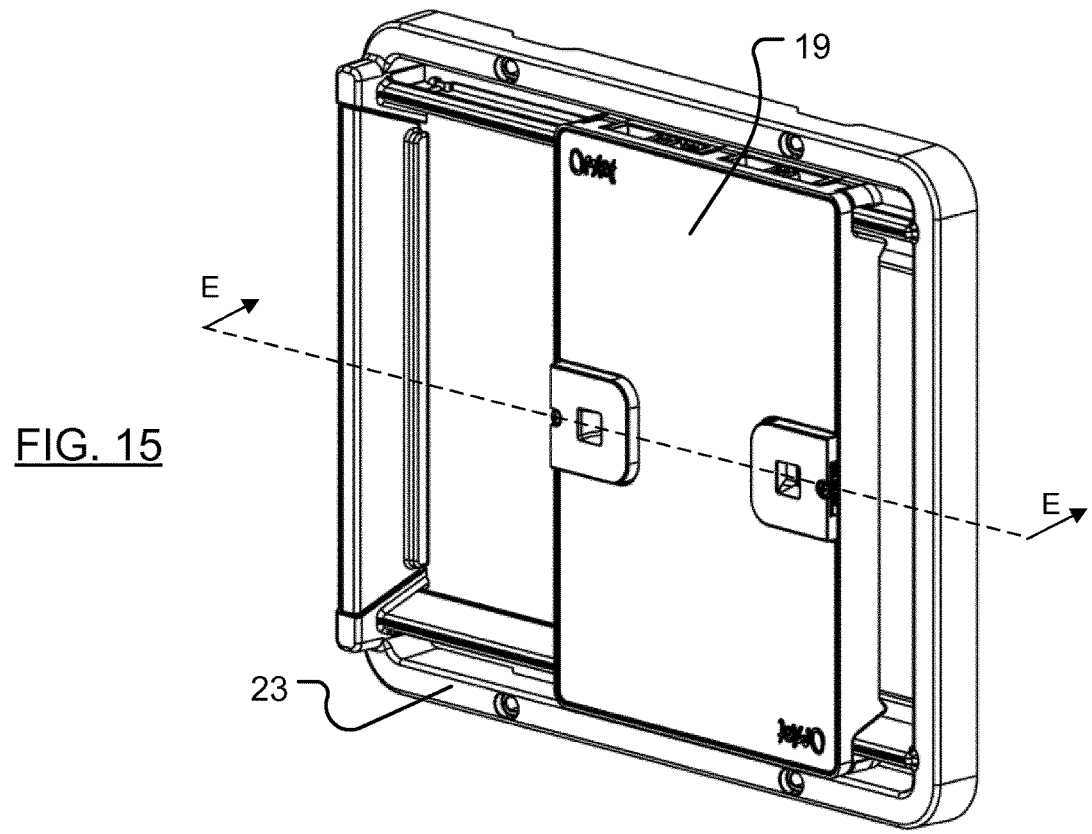

FIG. 14 is a schematic view of the door 19 in a state where the rack 101 is located within the letterbox shaped aperture, and FIG. 15 is a schematic view of the door in a state where the fixings have been partly withdrawn from the bolts. FIG. 16 is a cross-sectional view through the door assembly along the line D-D of FIG. 14 with the door in a closed position. As can clearly be seen from FIG. 16, with the fixings 109 fully mated with the nuts 110, the rack 101 is engaged with the pinion 37 and the door can be driven by the motor. FIG. 17 is a cross-sectional view of the door assembly along the line E-E of FIG. 15, and as can clearly be seen from FIG. 17, with the fixings 109 withdrawn from the associated nuts 110, the rack is removed from engagement with the motor and can manually be moved to open and close the door.

It can also be seen from FIG. 16 in particular, that when the door is closed, the door is recessed relative to an adjacent edge 112 of the frame 23. This is advantageous as it makes it harder for a predator to get their claws in between the frame and the door to try and open the door.

This arrangement is advantageous in that if the power source for the motor, or indeed the motor itself, should fail (or if the rack and pinion should be fouled with detritus) then the door can manually be opened or closed simply by undoing the fixings to release the rack from the pinion.

Figure 18:
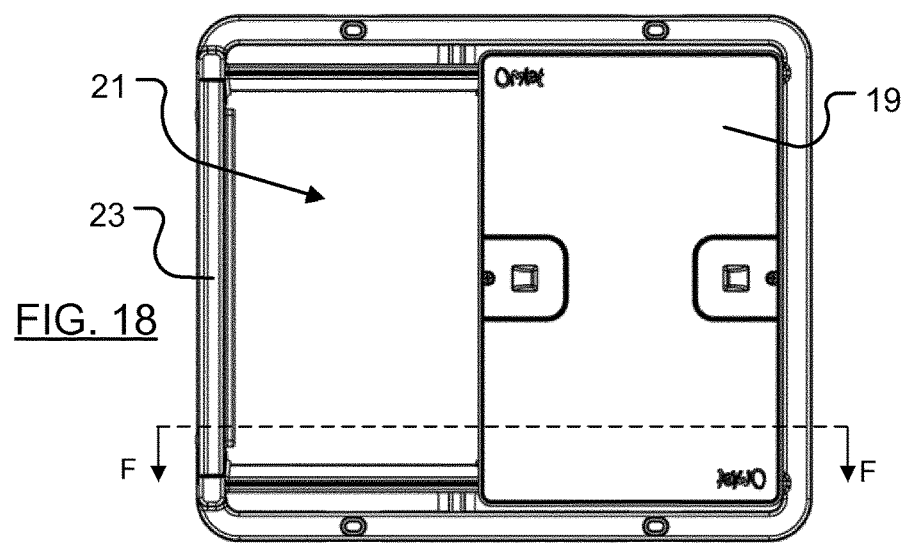
FIG. 18 is a front elevation of a door assembly.
Figure 19:
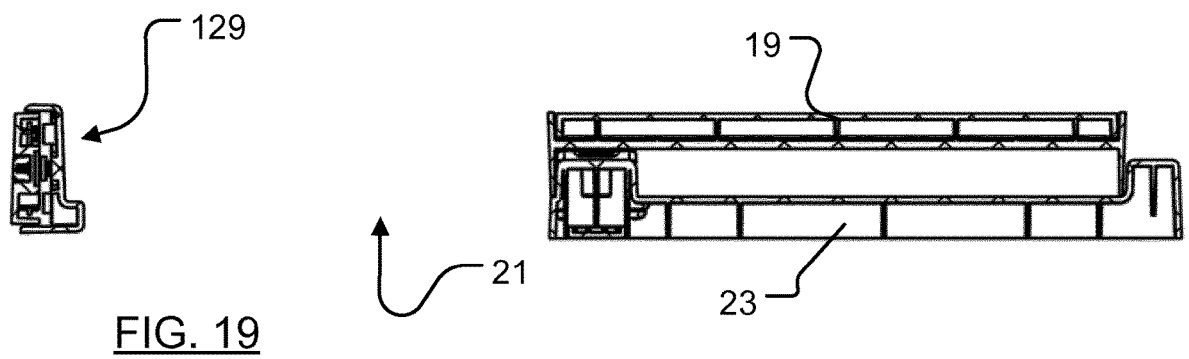
FIG. 19 is a cross-sectional view along the line F-F of FIG. 18.
Figure 20:
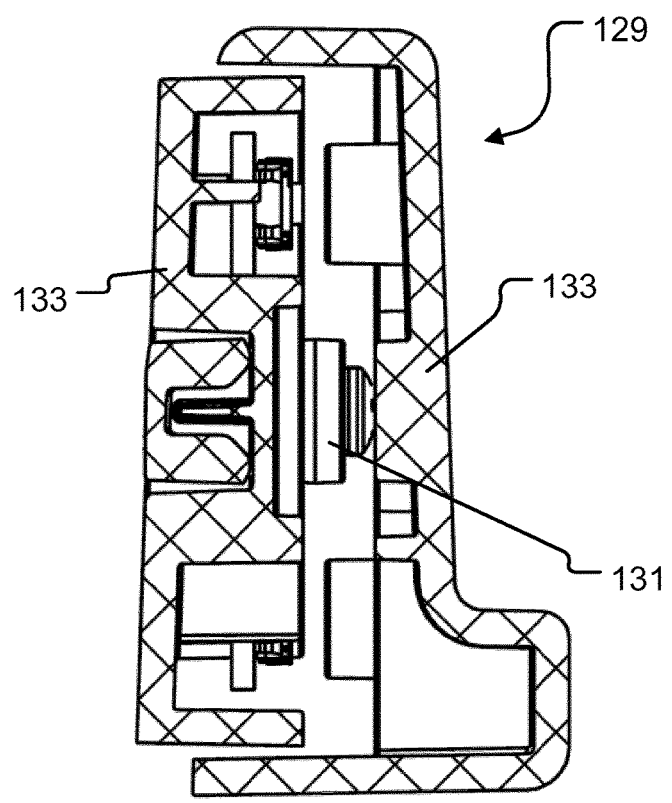
FIG. 20 is an enlarged cross-sectional view of a crush detector.

FIG. 18 is a front elevation of the door assembly 13, FIG. 19 is a cross-sectional view along the line F-F of FIG. 18, and FIG. 20 is an enlarged view of a crush detector 129 that is mounted to a wall of the frame adjacent the opening 21.

As shown in FIG. 20, the crush detector 129 comprises a tactile switch (also known as a TACT switch) 131 fixed to a wall 133 of the frame. A cover 135 extends over the switch 131 and extends around either end of the frame wall 133. If a chicken, for example, should be caught in the opening of the door assembly as the door closes, the chicken will be pushed gently towards the cover 135. The cover 135 will then move towards the frame wall 131 and activate the tactile switch 131, whereupon a signal is sent to the controller 15 to interrupt operation of the motor. The controller may then operate the motor in the opposite direction, before trying again to close the door. In the preferred embodiment, the cover extends over the majority of the frame adjacent the opening, and a plurality of switches are provided between the frame and the cover—operation of any one of which sends a signal to the controller.

Figure 21:
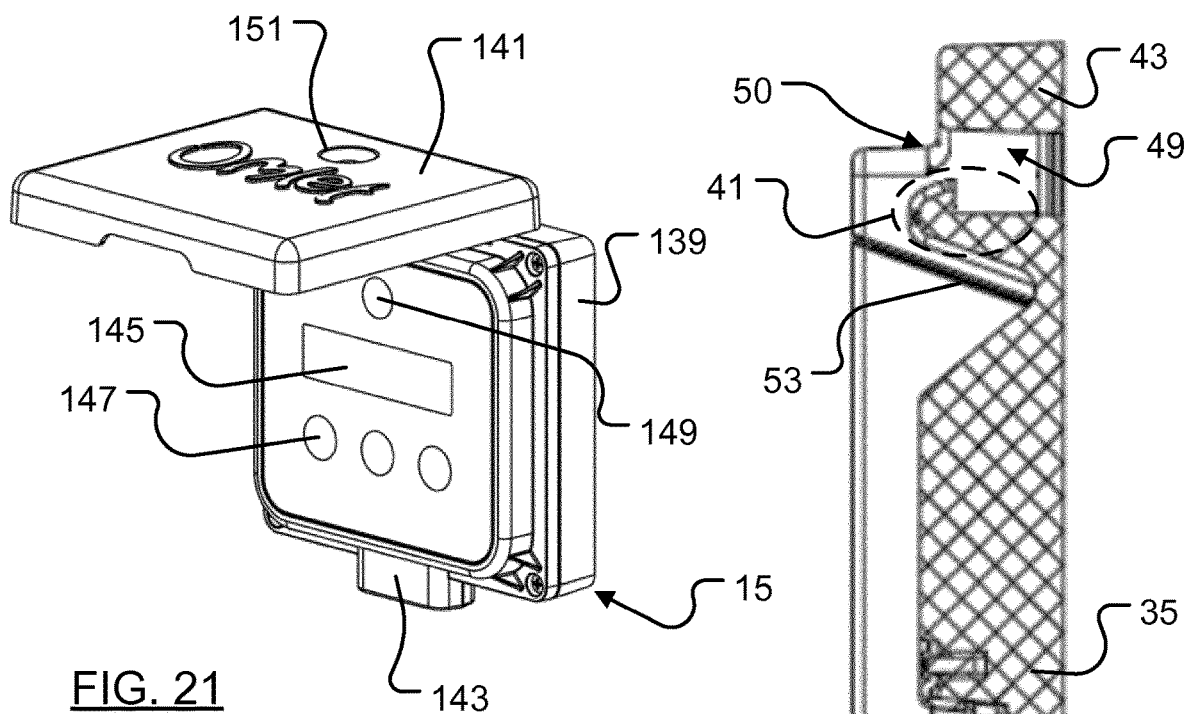
FIG. 21 is a perspective view of a controller.

FIG. 21 is a schematic view of an illustrative controller 15 for use with the door assembly 13. The controller 15 includes a weather resistant housing comprising a main housing 139 (inter alia for the electronics) and a cover 141. The controller includes an input channel 143 by means of which wiring to connect the controller to the door assembly (and optionally to the lamp 13) may be connected to the electronics within the main housing 139. The main housing may also include a housing for a battery, and optionally an input for an external power source (for example, for a mains lead or an external battery or a solar panel). Within the housing there is also provided an input for connection to cabling from the door assembly 13 and (optionally) the lamp 17.

Control electronics, for example a microcontroller or other processor, provided within the housing 139 is coupled to a display screen 145 and to a plurality of operating buttons 147 so that the user can program the controller, for example to open and/or close the door at predetermined times. The controller also preferably includes a photosensor 149 that can be illuminated via a window 151 in the cover 141, and the controller may be programmable to open and close the door at predetermined light levels.

The control electronics are configured, in a preferred arrangement, to monitor the stall current of the motor. The control electronics are also provided with data concerning the amount of time it should take to close and open the door. In an envisaged mode of operation, the controller may be configured, on commencement of an operation to open of the door, to start a timer and then monitor the stall current of the motor 37 until a predetermined point before the previously programmed time taken to fully close the door. If the stall current of the motor should rise beyond a predetermined threshold before this point in time, it is likely that the door has become fouled—either by a chicken or detritus being in the way of the door—and the controller is configured to stop the motor, and then operate the motor in the opposite direction to open the door slightly. The controller may then try again to close the door. This process may be repeated a number of times before the controller determines that the door cannot be closed and stops attempting to drive the motor to close the door. At this juncture the controller may sound a warning or display a warning message to alert the user to a malfunction of the door.

Once the aforementioned point in time before the pre-programmed time to fully close the door has been reached, the controller stops monitoring the stall current of the motor and instead continues to operate the motor until a signal is received that indicates that one or more of the crush detectors has operated. At this juncture the controller determines that the door has closed, and the motor is deactivated.

The controller is also preferably configured to halt operation of the motor if one or more of the crush detectors should be operated, whereupon the controller may run the motor in the opposite direction for a short period of time before once again trying to close the door. This process may be repeated a number of times before the controller gives up trying to close the door. At this juncture the controller may be configured to wait for a predetermined period of time before trying again.

When opening the door from the closed position, the controller simply energises the motor in reverse for the pre-programmed amount of time that is required to close the door. Once again, the controller may monitor the stall current of the motor to determine if opening of the door is being obstructed.

Figure 22:
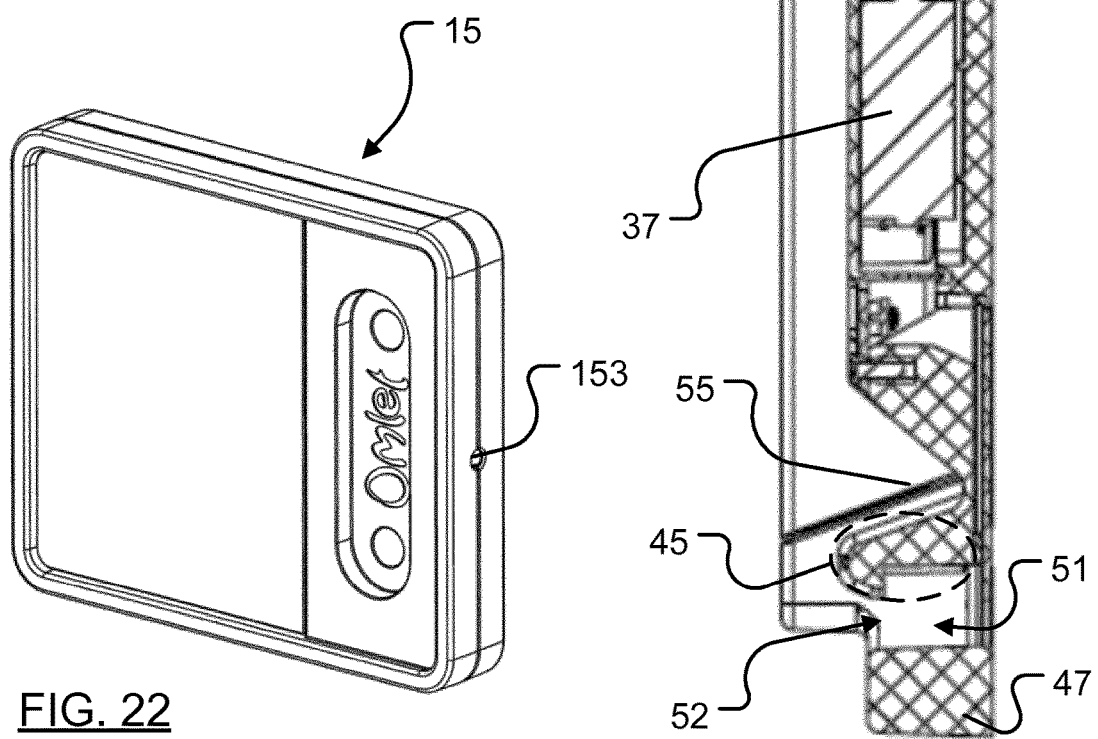
FIG. 22 is a perspective view of a light module.

Referring to FIG. 22, there is depicted an optional lamp for use with the door assembly and the controller 15. The lamp 17 includes an input 153 for wiring from the controller 15 and may include, for example, a plurality of long-life light emitting diodes. The light is typically provided within a coop, and can be illuminated automatically by the controller 15, or optionally manually by a user using a switch (not shown). Power for the lamp may be drawn from the controller, or optionally from a power source within the lamp.

As an alternative to a wired connection, the lamp may be wirelessly connected (for example by means of a short range communications system, such as Bluetooth™ or Zigbee™) to the controller.

In a particularly preferred arrangement, the controller may be configured to illuminate the lamp a predetermined amount of time before operating the door assembly to close the door. This is advantageous as it has been determined that chickens, in particular, tend to be drawn towards the light. As such, by illuminating the lamp at dusk, for example, whilst the door is open any chickens outside of the coop will tend to be drawn into the coop—thereby lessening the chance of any chickens being left outside of the coop when the door is closed.

It is envisaged that the door assembly herein described will be offered for sale bundled with the controller, and that the lamp may be an optional extra for purchase by users.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. For example, whilst in the foregoing the projections are carried by the door and mate with apertures in the frame, it is anticipated that the projections could be carried by the frame and mate with apertures in the door.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A door assembly for an animal enclosure, the door assembly comprising:
a frame for mounting over an aperture in a wall of the enclosure, the frame defining an opening through the door assembly, wherein the frame includes a first frame wall, a second frame wall, and adjacent peripheral frame walls, wherein at least one of the first frame wall and the second frame wall is inclined so as to encourage debris to fall away from the frame;
a door moveably mounted in the frame, the door being moveable between a position where the aperture in the wall is open for the passage of an animal and a position where the aperture in the wall is closed thereby to prevent the passage of an animal; and
a motor for driving the door between the closed and open positions,
further comprising a first two-part locking mechanism operable to lock the door to the frame when the door is open;
wherein said first two-part locking mechanism comprises a locking pin carried by one of the door and the frame that is engageable with a socket on the other of the door and the frame when the door is in the open position;
further comprising a second two-part locking mechanism operable to lock the door to the frame when the door is closed;
wherein said second two-part locking mechanism comprises a locking pin carried by one of the door and the frame that is engageable with a socket on the other of the door and the frame when the door is in the closed position; and
wherein the motor includes a motor housing and the motor housing includes one of the locking pin or the socket of the first two-part locking mechanism and the motor housing includes one of the locking pin or the socket of the second two-part locking mechanism.

2. A door assembly according to claim 1, wherein the motor is provided within the frame.

3. A door assembly according to claim 1, wherein the motor is configured to drive a pinion that is engageable with a rack carried by the door.

4. A door assembly according to claim 3, wherein the rack is moveable between a position where the rack engages with the motor driven pinion, and a position where the rack is disengaged from the motor driven pinion.

5. A door assembly according to claim 1, wherein a leading edge of the door is recessed when the door is closed to obstruct access for predators.

6. A door assembly according to claim 1, wherein said first two-part locking mechanism is configured to tighten the door against the frame.

7. A door assembly according to claim 1, wherein said second two-part locking mechanism is configured to tighten the door against the frame.

8. A door assembly according to claim 1, wherein said assembly is capable of being mounted in one of a plurality of different orientations.

9. A door assembly according to claim 1, further comprising a crush detector comprising one or more TACT switches.

10. A door assembly of claim 1, wherein the first frame wall and the second frame wall are each inclined toward the adjacent peripheral walls and regardless of: 1) a first orientation of the door assembly, or 2) a second orientation of the door assembly rotated through 180 degrees with regard to the first orientation, debris falls away from a position where it impedes progress of the door.

11. A door assembly of claim 10, wherein the door includes a first inclined door wall and a second inclined door wall, each of which include an angle complementary to the first frame wall and to the second frame wall, wherein the inclined first frame wall and the inclined second frame wall of the door frame and the inclined first door wall and the inclined second door wall are adjacent to one another when the door is mounted in the frame.

* * * * *